July 11, 1967

C. R. COPELAND 3,330,076

BELT GRINDING MACHINE

Filed Sept. 14, 1964

CLINTON R. COPELAND
INVENTOR.

BY *Arthur L. Nelson*

ATTORNEY

CLINTON R. COPELAND
INVENTOR.

ATTORNEY

United States Patent Office 3,330,076
Patented July 11, 1967

3,330,076
BELT GRINDING MACHINE
Clinton R. Copeland, 203 Northwood Ave.,
East Rochester, N.Y. 14445
Filed Sept. 14, 1964, Ser. No. 396,288
8 Claims. (Cl. 51—147)

This invention relates to a grinding machine and more particularly to a belt grinding machine.

Belt grinding machines in general provide a belt grinding surface for sanding a workpiece. Few belt grinding machines, however, provide the versatility of the machine subsequently described, which include means for adjustably positioning the workpiece to any desired position as it is brought into engagement with the grinding belt and also means for adjusting the belt grinding surface through a plurality of angles for convenience in sanding the workpiece.

It is an object of this invention to provide a belt grinding machine having means for adjustably positioning the working surface of the grinding belt from a horizontal to a vertical position.

It is another object of this invention to provide a belt grinding machine having work supporting means to control the position of the workpiece as it is brought into engagement with the grinding belt.

It is a further object of this invention to conveniently position the working surface of the grinding belt and enclose the remaining belt surface to promote safety during operation of the machine.

The objects of this invention are accomplished by providing a base structure having an upright standard extending therefrom. A motor having a drive pulley is swingably supported on the standard to provide adjustment for belt tensioning. A bar carrying two idler belt pulleys is pivotally mounted in spaced relation to the motor mount. A grinding belt frictionally engages the pulleys and is driven by the drive pulley. The bar may be pivoted from a horizontal position to a vertical position to adjust the belt working surface through a plurality of angular positions.

A work supporting table having a guide is mounted on the base to support the workpiece as it is slidably advanced to engagement with the grinding surface. A belt guard encloses a portion of the belt during operation to provide safety.

The preferred embodiment of this invention is described in the subsequent paragraphs and illustrated in the attached drawings.

Figure 1:
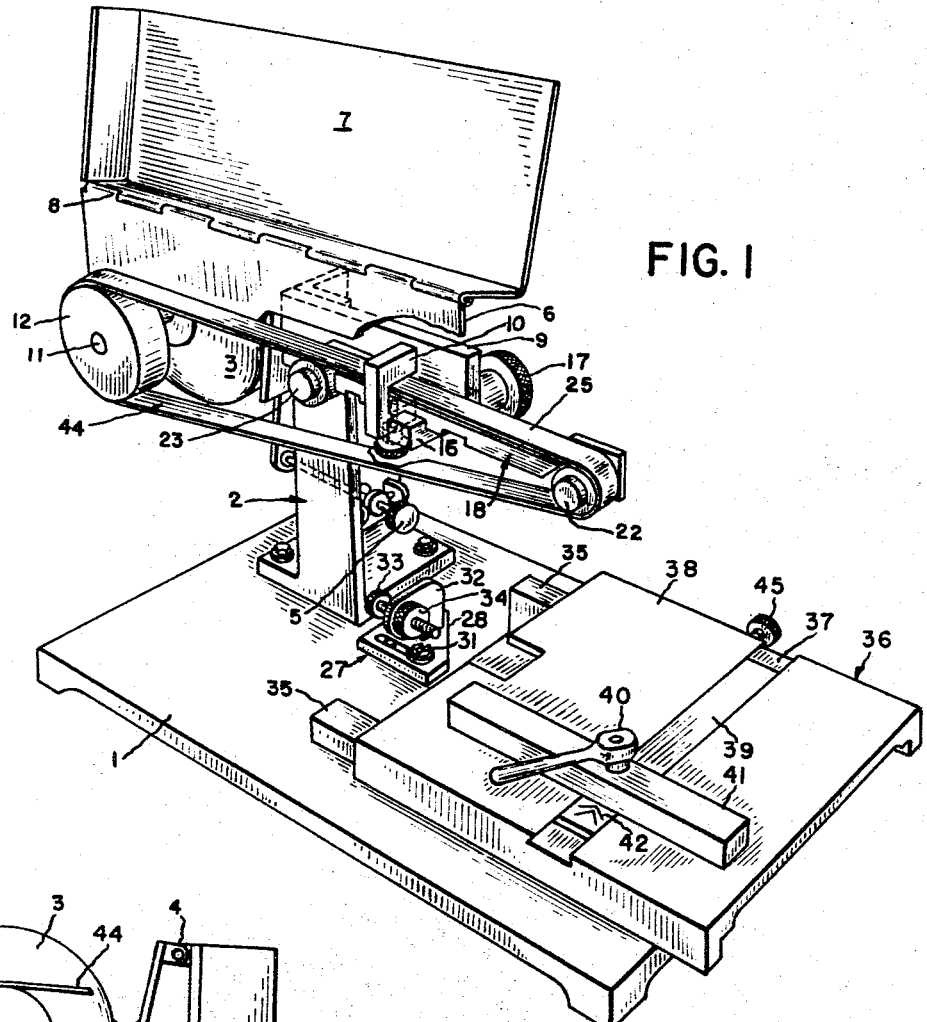
FIG. 1 is a three dimensional view of the grinding machine with the belt guard pivoted out of position to illustrate the location of the various components of the machine and with the working surface of the grinding belt in a horizontal position.
Figure 2:
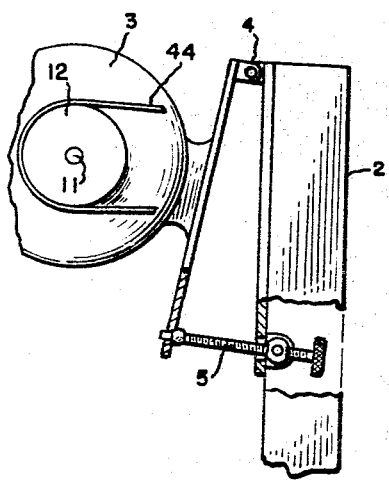
FIG. 2 is a view of the device for adjustably positioning the motor relative to its supporting structure.

Referring to the drawings FIG. 1 illustrates a three dimensional view of the grinding machine having a base 1 which supports the machine. An upright standard 2 is illustrated fastened to the base to provide a supporting means for the motor and the grinding belt. The upright standard 2 may be integral with the base if so desired. The standard 2 supports the motor 3 for swinging movement on the hinge 4. The motor 3 in its normal rest position swings downwardly to engage the standard 2.

An adjusting screw 5 threadedly engages the standard 2 and swings the motor 3 outwardly from the standard when the screw is rotated to provide adjustment in tensioning of the belt.

Figure 3:
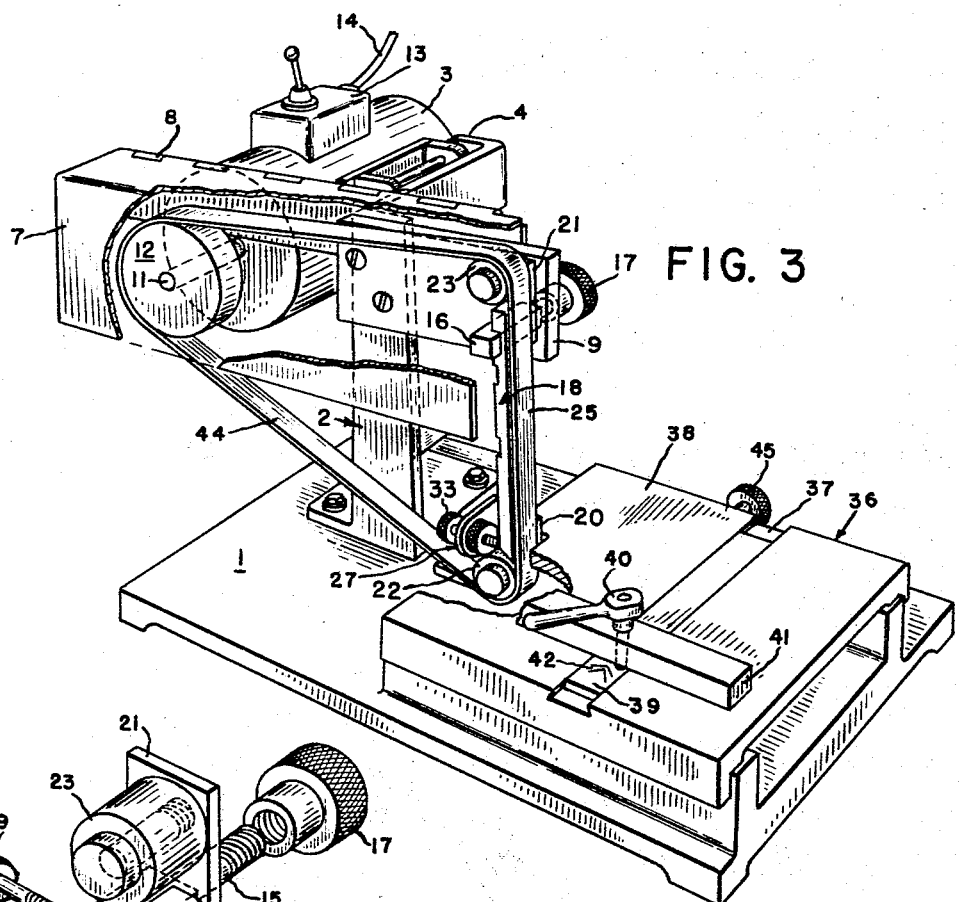
FIG. 3 is a three dimensional cross sectional view with the working surface of the grinding belt in a vertical position.
Figure 5:
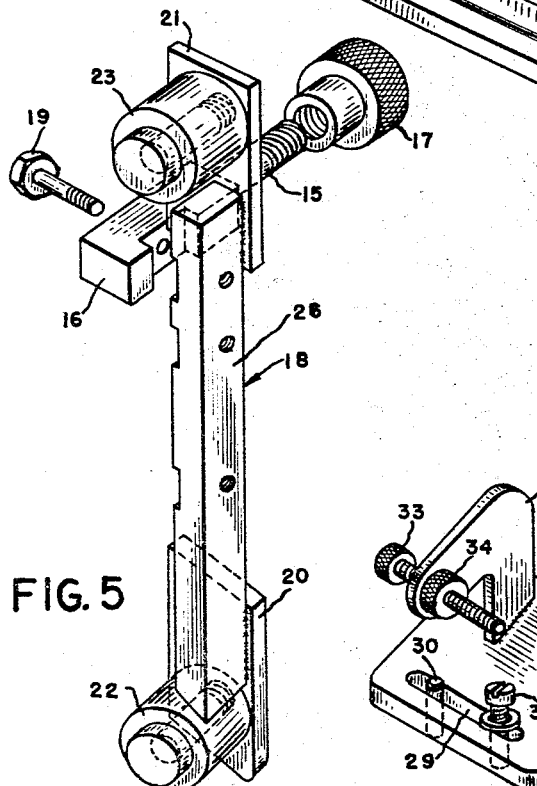
FIG. 5 is an exploded view of the idler pulley supporting bar.

The standard 2 also supports a guard plate 6 which is hinged to the guard cover 7 by the hinge 8. The cover may be swung to a vertical position as illustrated when adjusting the machine, and returned to the guarding position as shown in FIG. 3. The stop block 10 is fastened to a bar 18. The stop block 10 provides a workpiece stop when the working surface of the grinding belt is in the horizontal position. The stop block 10 positioned as shown provides greater working area than if positioned on bar 18 farther from drive pulley 12.

The motor 3 has a drive shaft 11 which drives the pulley 12. A switch 13 controls energization of the motor 3 from a suitable source of elecrtical energy through an electrical cord 14. The switch is suitable for providing forward operation and reversible operation of the motor depending on whether the working surface 25 is in the horizontal or vertical position.

An arm 9 supported on the standard 2 has a circular opening to receive the bolt 15 which supports the bracket 16. A knurled knob 17 which is threaded internally operates as a nut on the bolt 15 to fasten the bracket 16 to arm 9. The bar 18 has notches on its underside to receive the bracket 16 which is fastened to the bar by the bolt 19. The bar 18 is fabricated with two endpieces 20 and 21 which provide the supporting means for the pulleys 22 and 23 respectively. The bar 18 is supported by the bolt 15 and bracket 16.

Figure 4:
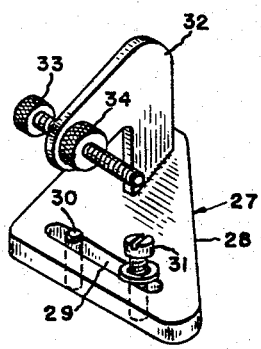
FIG. 4 is a bracket providing a stop for the lower end of the idler pulley supporting bar when the bar is in the vertical position.

The bar 18 controls the angular relationship of the working surface 25 of the sanding belt. The working surface 25 is defined by the space intermediate the pulleys 22 and 23. A portion of the bar 18 forms a flat surface 26 which operates as a backing plate supporting the belt when the pressure is exerted on the working surface 25 of the belt. The working surface 25 may be pivoted to any angular position so desired by the operator. The vertical position of the grinding surface 25 is shown in FIG. 3. When the bar 18 is pivoted so that the working area 25 is in vertical position the adjustable stop 27 is positioned immediately behind the lower end of the bar 18. The stop 27 is illustrated in FIG. 4. The stop 27 includes a bracket 28 having a longitudinal slot 29 receiving a dowel 30 and a fastening screw 31. An L-shaped arm 32 extends upwardly to receive a thumb screw 33 and a lock nut 34 which adjustably positions the forward end of the screw 33 which engages the bar 18. When the bar 18 is in the vertical position its alignment is maintained by the bolt 15 and the stop 27.

The base 1 is provided with horizontal rails 35 which support the table 36. The table may be slide on the rails 35 to permit swinging of the bar 18 to or from a vertical position. The table 36 may also be locked in its position relative to the base 1 by the lock screw 45 on the side of the table.

A dove-tail slot 37 is formed transverse in the table top 38 and a mating dove-tailed key 39 is received within the slot 37. The key 39 slidably moves within the slot 37. A screw 40 with a handle extends through the guide 41 and threadedly engages the dove-tailed key 39.

To indicate the relative position of the guide 41 relative to the table 36 an angular scale 42 is stamped on the key 39. The scale provides an added convenience for accurately determining the precise angle of the workpiece as it is engaging the working surface of the belt 44.

The adjustment of the working surface 25 may be accomplished in the following manner. The knurled knob 17 is loosened to permit rotation of the bar 18 to adjustably position the angle of the working surface 25 relative to the machine. As the working surface is changed from the horizontal position to the vertical position the belt tightener is loosened to permit the motor to swing inwardly toward the standard. The stop block 10 is removed when the bar is in the vertical position and the workpiece rests on the scale. The bar swings into a vertical position as shown in FIG. 3. The table is moved out of the way to accommodate swinging of the bar 18. The stop 27 is then positioned behind the lower end of the bar 18 to accurately locate and retain the working surface 25 once it is established. The motor adjusting screw 5 is then tightened to provide the desired tension of the belt 44.

The table is positioned adjacent the belt for supporting the workpiece as it engages the working surface 25. The angle of the workpiece is controlled by the guide 41 on the table 36.

It can be seen from this description that the belt grinding machine as described is versatile in operation and provides a working surface in an infinite number of angles between the horizontal and vertical position. The table and guide provides a means of accurately controlling the workpiece as it is sanded.

The preferred embodiment of this invention has been illustrated of which other embodiments may be devised which would fall within the scope of this invention which is defined by the attached claims.

What is claimed is:

1. A belt grinding machine comprising, a base having an upright standard, a motor having a drive pulley hingedly supported on said standard, a bar pivotally mounted on said standard horizontally spaced from said motor, a pair of idler pulleys rotatably mounted on said bar, a sanding belt aligned on said pulleys driven by said drive pulley on said motor, belt adjusting means engaging said standard and said motor to provide a swinging movement of said motor relative to said standard to adjustably tension said belt when said bar is adjustably positioned for the desired belt working angle.

2. A belt grinding machine comprising, a base having an upright standard, a motor having a drive pulley mounted for swinging movement on said standard, a bar pivotally mounted on said standard defining a backing plate, at least two idler pulleys rotatably mounted on said bar, a grinding belt aligned on said pulleys and forming a working surface in the area where said belt engages said backing plate, means adjustably positioning said motor relative to said standard for tensioning said belt as said bar is pivotally adjusted to provide the desired angle of said working surface.

3. A belt grinding machine comprising, a base having an upright standard, a motor having a drive pulley mounted for swinging movement on said standard, a bar pivotally mounted on said standard for angular movement relative to said standard, at least two idler pulleys rotatably mounted on said bar, a grinding belt frictionally engaging said pulleys, a backing plate formed by said bar defining a working surface on the portion of said belt intermediate said idler pulleys, means angularly pivoting said bar relative to said standard to thereby vary the angle of the working surface through an infinite number of angles from a horizontal to a vertical position.

4. A belt grinding machine comprising, a base having an upright standard, a motor having a drive pulley movably mounted on said standard, a bar pivotally mounted on said standard for selective positioning between a horizontal and a vertical position, at least two idler pulleys rotatably mounted on said bar, a grinding belt frictionally engaging said pulleys, a backing plate formed by said bar defining a working surface on the portion of said belt intermediate said idler pulleys, a table slidably mounted on said base and adapted for supporting a workpiece during engagement with the working surface of said belt.

5. A belt grinding machine comprising, a base having an upwardly extending standard, a motor mounted on said standard and having a drive pulley, a bar pivotally and adjustably mounted on said standard in substantially vertical position and spaced from said motor, at least two idler pulleys rotatably mounted on said bar, a grinding belt frictionally engaging said pulleys, a belt backing surface defined by said bar and forming a working surface on said belt intermediate said idler pulleys, a table having locking means slidably mounted on said base, a guide having locking means for angularly adjusting the position of said guide on said table to thereby provide a work supporting means adapted for positioning a workpiece in any angular relation to said belt as the work is supported for engagement with said belt when the working surface is in a substantially vertical position.

6. A belt grinding machine comprising, a base having an upwardly extending standard, a motor having a drive pulley movably supported on said standard, a bar mounted in a vertical position on said standard in spaced relation to said motor, at least two idler pulleys rotatably mounted on said bar, a grinding belt frictionally engaging said pulleys, a backing surface formed on said bar defining a working surface on the portion of said belt intermediate said idler pulleys, a table mounted on said base, a guide and a locking means on said table adapted for adjustably positioning a workpiece on said table, a scale and indicator on said table indicating the angular relationship of said guide relative to said table for supporting said workpiece as it is brought into engagement with the working surface of said grinding belt.

7. A belt grinding machine comprising, a base having an upright standard, a motor having a drive pulley including means for movably supporting said motor on said standard, a bar pivotally mounted on said standard, a plurality of pulleys rotatably mounted on said bar, means pivotally moving said bar from a vertical to a horizontal position, a grinding belt frictionally engaging said pulleys, a backing surface formed by said bar defining a working surface on said belt intermediate said pulleys, a horizontal work stop mounted on said bar when said bar is pivoted to a horizontal position to thereby provide a rest for a workpiece when the working surface is in the horizontal position.

8. A belt grinding machine comprising, a base having an upright standard, a motor having a drive pulley swingably supported on said standard, a bar, bracket means pivotally supporting said bar on said standard, two idler pulleys rotatably supported on said bar, a grinding belt frictionally engaging said pulleys and driven by said drive pulley, and adjustable means adjustably connecting said bracket means to said bar to provide a plurality of extended positions of said bar relative to said standard, means permitting adjustable rotation of said bar relative to said standard, and means swingably moving said motor relative to said standard to thereby adjust the tension of said belt to accommodate the extended positioning of said bar.

References Cited

UNITED STATES PATENTS

| | | | |
|---|---|---|---|
| 2,433,427 | 12/1947 | Carlsson | 51—147 |
| 2,491,346 | 12/1949 | Wetzel | 51—94 |
| 2,663,978 | 12/1953 | Lindmark | 51—135 |
| 3,022,611 | 2/1962 | Schaller | 51—141 |
| 3,133,384 | 5/1964 | Liard | 51—147 X |

FOREIGN PATENTS 105,276    4/1917    Great Britain.

ROBERT C. RIORDON, *Primary Examiner.*

D. G. KELLY, *Assistant Examiner.*